United States Patent [19]
Omi et al.

[11] Patent Number: 4,780,830
[45] Date of Patent: Oct. 25, 1988

[54] COMBINATION WEIGHING AND PACKING SYSTEM

[75] Inventors: Yuji Omi, Koshigaya; Yoshiharu Toyoda, Akashi; Masato Inoue, Ono, all of Japan

[73] Assignees: Kabushiki Kaisha Kawashima Seisakusho; Yamato Scale Company, Limited, both of Japan

[21] Appl. No.: 916,271

[22] Filed: Oct. 7, 1986

[30] Foreign Application Priority Data

Oct. 16, 1985 [JP] Japan .................. 60-231982

[51] Int. Cl.⁴ .................. G06F 15/46; G01G 13/02
[52] U.S. Cl. .................. 364/478; 53/502; 177/25; 364/567
[58] Field of Search .................. 364/478, 567; 53/51, 53/52, 167, 502, 507, 508; 177/1, 3, 4, 5, 25.11, 25.12, 25.13, 25.18, 25.19, 245

[56] References Cited

U.S. PATENT DOCUMENTS

| | | | |
|---|---|---|---|
| 4,288,965 | 9/1981 | James | 53/451 |
| 4,415,048 | 11/1983 | Teraoka | 53/502 X |
| 4,494,619 | 1/1985 | Matsuno | 177/25.18 |
| 4,520,883 | 6/1985 | Fukuda | 177/25.18 X |
| 4,543,766 | 10/1985 | Boshinski | 53/502 X |
| 4,548,024 | 10/1985 | Fine | 53/502 |
| 4,553,616 | 11/1985 | Haze | 177/1 |
| 4,632,254 | 12/1986 | Scopatz | 53/502 X |
| 4,661,917 | 4/1987 | Haze et al. | 364/567 |

*Primary Examiner*—Joseph Ruggiero
*Attorney, Agent, or Firm*—Senniger, Powers, Leavitt and Roedel

[57] ABSTRACT

A combination weighing and packing system including a combination weighing machine and a packing machine which are functionally interlocked with each other so that batches of product weighed out by the weighing machine in accordance with a prescribed weight condition are packed successively in bags by the packing machine, and a common control unit having a display screen and a keyboard, which stores a number of operation parameters of the weighing and packing machines which are selectively displayed on the screen and can be changed or corrected easily by keyboard operation of an operator.

26 Claims, 4 Drawing Sheets

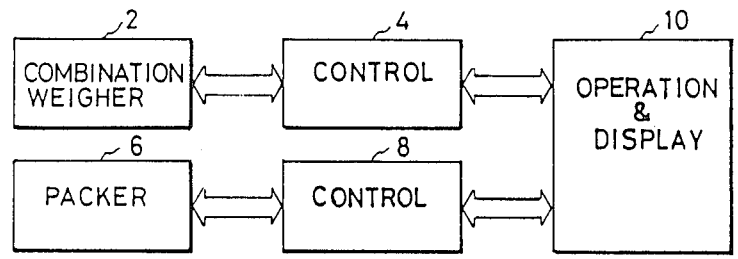
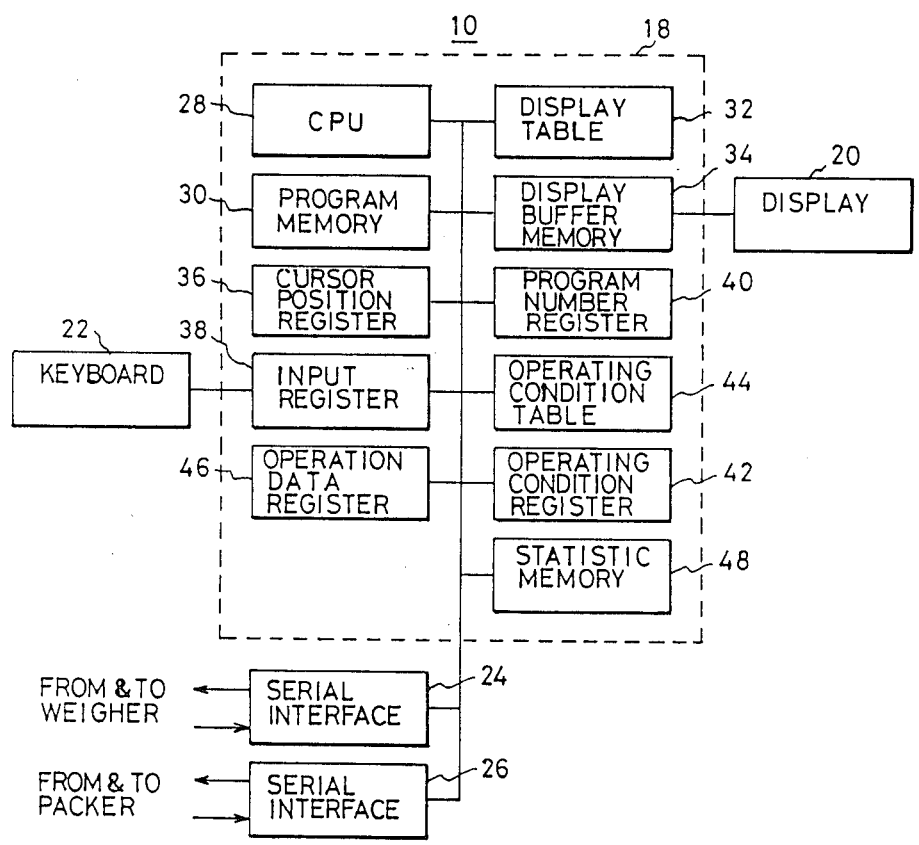
FIG. 2

```
PROGRAM No. 10      PRODUCT: POTATOCHIPS
TARGET WT.  100.0g     SUM WT.
WEIGH UNIT  1 2 3 4 5 6 7 8 9 10 11 12 13 14    L A H

MEAN WT.            NUMBER OF UNITS
SPEED               AMPLITUDE   40
BAG LENGTH 250 mm       R.P.M.  65
TOTAL DELIVERIES                              90
                                              □

92
AUTO  UNLOAD  ZERO  MANUAL  STATISTIC  PRINT  SETTING
```

FIG. 6

```
PROGRAM No. 10       PRODUCT: POTATOCHIPS
TARGET WT.  100.0 g    SUM WT.  100.2g
WEIGH UNIT  1 2 3 4 5 6 7 8 9 10 11 12 13 14    L A H
                O       O   O                     O

MEAN WT.  100.1g    NUMBER OF UNITS  3.0
SPEED   65.0 b/m    AMPLITUDE   40
BAG LENGTH 250 mm       R.P.M.  65
TOTAL DELIVERIES  150 bags

94
AUTO                         STATISTIC  PRINT  SETTING
```

FIG. 7

COMBINATION WEIGHING AND PACKING SYSTEM

This invention relates to an improved combination weighing and packing system and, particular, to a novel operation and display device thereof for setting and displaying various operation parameters of the system.

BACKGROUND OF INVENTION

It has been known to couple a combination weigher such as disclosed in U.S. Pat. No. 4,553,616 with a packing machine such as disclosed in U.S. Pat. No. 4,288,965 for successively packing batches of weighed product sequentially into bags. More specifically, as described in the above U.S. patents, the combination weigher serves to combine weights of product fed to a plurality of weighing units in predetermined fashion and select from the resultant combinations a combination the sum of which satisfies a predetermined condition and to deliver the batch of product constituting the selected combination, and the packing machine serves to form a bag from a sheet of material and to pack the delivered batch of product in the bag. Such weighing and packing operations are automatically repeated.

It has been a general practice to design and manufacture such combination weigher and packing machine independently in different plants or by different manufacturers and to provide them with separate operation and display devices, respectively. The operation and display device as referred to in this specification means a device for providing the weigher and packing machine such operation parameters as target weight, allowable deviation, bag length, rate of delivery and likes, and displaying actual operation data such as combined weight, actual speed of operation and the like, as well as other operation parameters.

In such a combination weigher and an associated packing machine, it is troublesome for a single operator to set the operation parameters and monitor the state of operation with separate operation and display devices which are often located in different positions.

SUMMARY OF INVENTION

Accordingly, an object of this invention is to solve the abovementioned problem from the prior art combination weigher/packing machine system.

This object is attained in accordance with this invention by providing a common operation and display device for both the combination weigher and the packing machine, which supplies operation parameters to the weigher and packer and also displays operational data thereof.

The operation and display device of this invention includes an input section, a display section and a control section. The control section provides the combination weigher and the packing machine with corresponding operation parameters in accordance with operation of the input section, and receives the current operation data from the combination weigher and the packing machine for display in the display section.

These and other objects and features of this invention will be described in more detail below with reference to the accompanying drawings.

BRIEF DESCRIPTION OF THE DRAWINGS

In the drawings:

FIG. 1 is a block diagram representing a principle of this invention;

FIG. 2 is a block diagram representing a functional arrangement of an embodiment of the operation and display device of FIG. 1;

FIGS. 6 and 7 are front views of the display screen of the device of FIG. 4 displaying two examples of operation patterns used as an aid of explaining FIG. 5.

DESCRIPTION OF PREFERRED EMBODIMENTS

Figure 3:
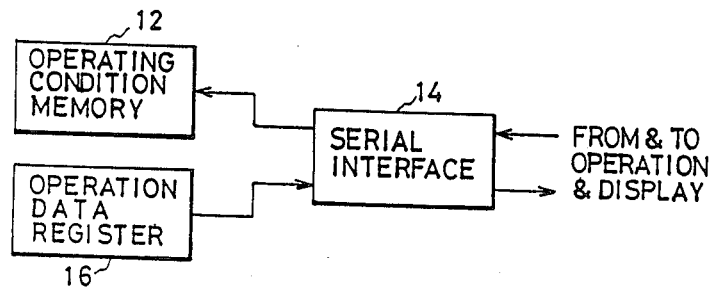
FIG. 3 is a block diagram representing details of the control section of FIG. 1.

As shown in FIG. 1, the combination weighing and packing system according to this invention includes a combination weigher 2 associated with its control device 4, a packing machine 6 associated with its control device 8, and an operation and display device 10 coupled to both control devices 4 and 8. As shown in FIG. 2, the operation and display device 10 is preferably composed of a commercially available microcomputer 18 accompanied by a display device 20 and a keyboard input device 22, and is coupled to the control devices 4 and 8 through serial interfaces 24 and 26, respectively.

As shown in FIG. 3 each of the control devices 4 and 8 includes an operating condition memory 12, a serial interface 14 and an operation data register 16. The operation condition memory 12 receives specified operation parameters from the operation and display device 10 through the serial interface 14 to store them for operation of the corresponding machine, while the operation data register 16 detects specified data of current machine operation and sends them through the serial interface 14 to the operation and display device 10 for display and statistic analysis.

Referring to again to FIG. 2, the microcomputer 18 of operation and display device 10, shown in dashed block, includes a central processing unit (CPU) 28 for executing various operations, such as setting, displaying and revising stored data, controlling and monitoring automatic and manual operations of the system and statistically analyzing operational data, in accordance with a program preset in a program memory 30. A display table memory 32 stores data patterns or formats to be display by the display device 20 through a display buffer memory 34. The display device 20 also displays a pointing cursor which is movable in response to a control signal provided from the keyboard 22 through a input register 38 as described later, and a cursor position register 36 follows the moving cursor to store its current position. A program number register 40 stores identification numbers for weighing and packing programs corresponding to different product handling and an operating condition register 42 stores some groups for possible data of operation parameters, such as target weight, vibration amplitude of vibration feeder, packing bag length and operation speed, corresponding to the program numbers stored in the register 40. Each program number and corresponding operating data are read out from the registers 40 and 42, respectively, and temporarily stored in an operating condition table memory 44 in a prescribed pattern for display using the content of memory 32 as described later. An operation data register 46 temporarily stores detected operating data serially transferred from the operation data register 16 of FIG. 3, which are successively displayed in real time by the display device 20. Some of these data are stored in a statistic memory 48 for optional statistic analysis.

Now, the description will be made in more detail about a preferred operation of the operation and display device 10 with reference to FIGS. 4 through 7.

Figure 4:
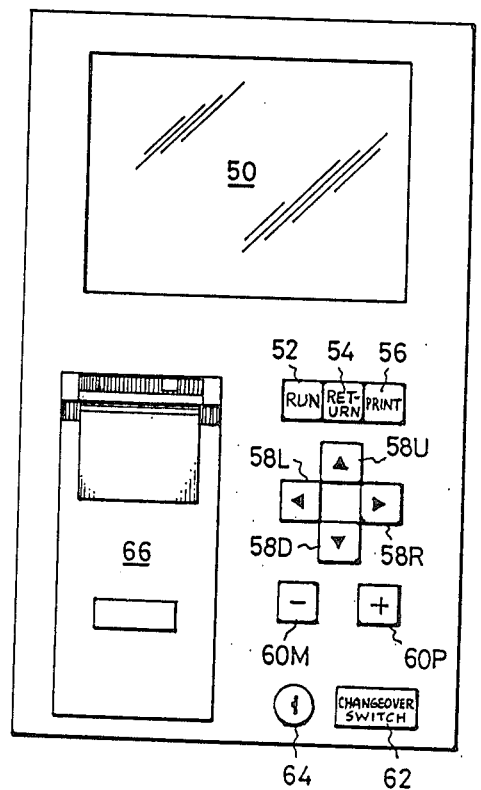
FIG. 4 is a front view of an example of the front panel of the embodiment of FIG. 2.
Figure 5:
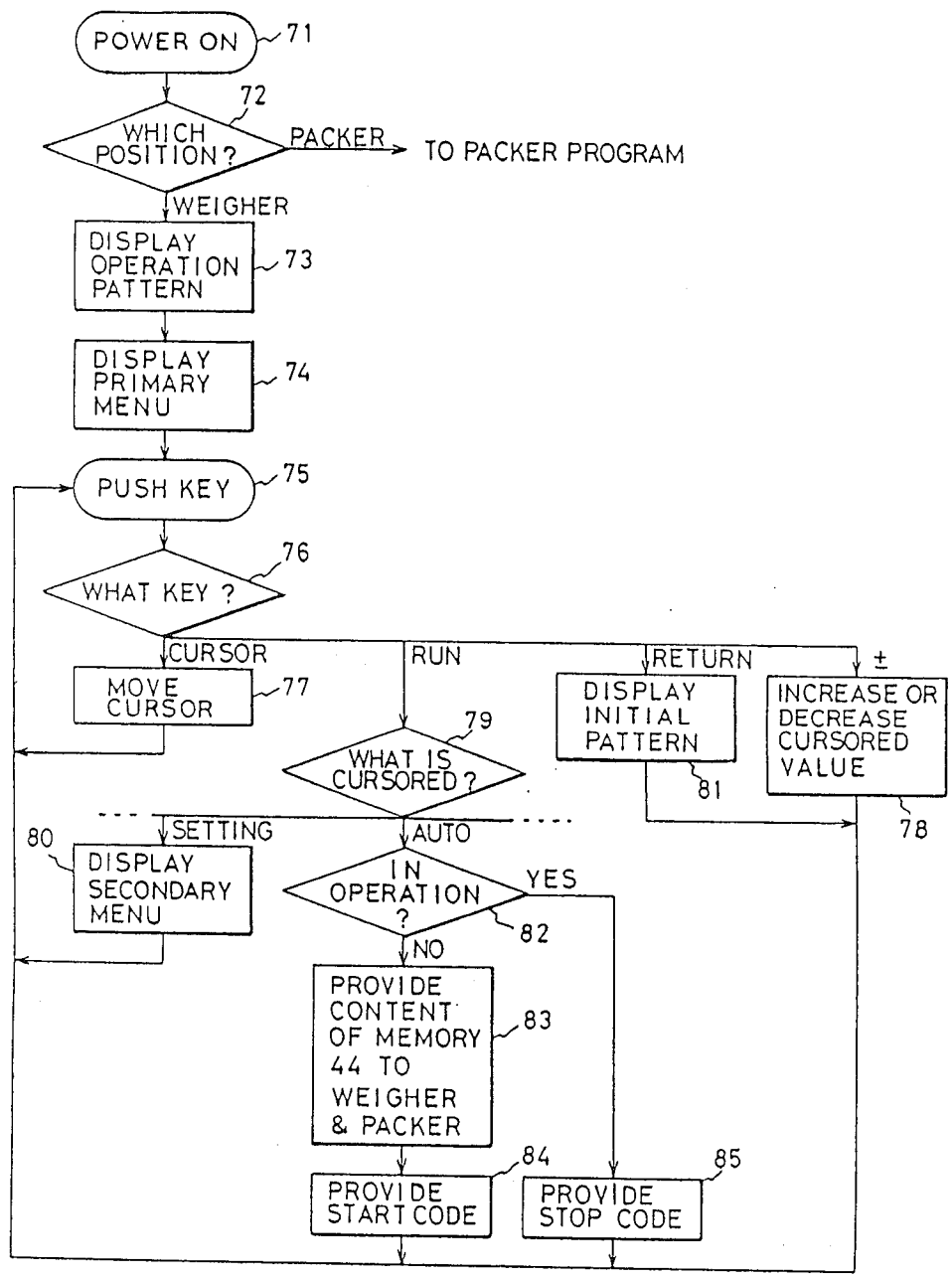
FIG. 5 is a flow chart representing a preferred operation of the embodiment of FIGS. 2 and 4.

FIG. 4 shows a preferred example of the front panel configuration of the operation and display device of this invention. In the drawing, 50 denotes a display screen of the display device 20, such as cathode ray tube. 52 and 54 denote, respectively, RUN and RETURN keys serving functions as described later. 56 denotes a PRINT key for starting a printer 66 to print out the image displayed on the screen 50. 58U, 58D, 58L and 58R denote CURSOR keys for moving the cursor displayed on the screen in both vertical and horizontal directions. 60P and 60M denote PLUS and MINUS keys for increasing and decreasing numerical values selected by the cursor on the display of screen 50. 62 denotes a weigher/packer change-over switch and 64 denotes a key switch for selectively confining the range of operation in order to prevent erroneous handling by unskilled operators.

When the key switch 64 is set properly and a power source is put on in step 71 (FIG. 5), it is first inquired in step 72 which position the switch 62 selects, WEIGHER or PACKER. Assuming now that the switch 62 has been turned to WEIGHER position, an operation pattern and a primary menu for the weigher are read out from the above-described elemements 32, 40 and 42 of microcomputer 18 and displayed on the screen 50 in steps 73 and 74. A preferred example of the displayed image is shown in FIG. 6, which gives the "primary menu" including AUTO, UNLOAD, ZERO, MANUAL, STATISTIC, PRINT and SETTING in the bottom row. These items mean automatic operation, unloading of all filled hoppers, zero correction, manual operation, statistic analysis, printing operation and parameter operation, respectively. Thus, the word "menu" means a list of operations which may be requested.

As shown in FIG. 6, the display device 20 displays program number "10" suitable for "potatochips", target weight "100.0" grams, vibration amplitude "40", bag length "250" millimeters and machine operation speed "65" r.p.m. If it is desired to change any of these specified values the operator pushes in step 75 the cursor keys 58U, 58D, 58L or 58R. Then, the key pushed is identified in step 76. Since the cursor key is pushed in this case, the displayed cursor 90 moves in accordance with key codes from the four keys. When the cursor is brought onto the value to be changed, the operator pushes the plus or minus key 60P or 60M in step 75. Then, this key is identified in step 76 and the cursored value is increased or decreased sequentially in step 78. When the cursored value reaches the desired value, the operator pushes CURSOR keys to move the displayed cursor to the "SETTING" position as shown by a dashed square 92 and, thereafter, pushes the RUN key. Then, the cursored menu is identified in step 79 and a "secondary menu" is displayed in step 80. The secondary menu includes additional weigher operating parameters, such as allowable upper and lower deviations of sum weight, hopper gate opening intervals and the like, as well as those parameters displayed with the primary menu. If there is any value desired to be changed on in this menu, it is corrected by operating CURSOR and PLUS/MINUS keys in the same manner as above. The operating parameters for the packing machine can be set in similar manner by turning the weigher/packer change-over switch 62 to PACKER position.

Upon completion of such setting operation, the operator pushes RETURN key 54 and the initial display pattern of FIG. 6 is thereby restored in step 81. Then, the operator moves the cursor to "AUTO" position and pushes RUN key 52. This position is identified in step 79 and it is inquired in step 82 whether the system is now being operated in its automatic mode or not. The answer is "NO" since the operation is not yet started. The operating parameters which have been set as above and stored in the operating condition table memory 44 are provided to the operating condition memories 12 in the control devices 4 and 8 of weigher 2 and packer 6 in step 83 and a start command is applied to the system to start its operation in step 84. Then, the displayed pattern changes into a pattern as shown in FIG. 7 in which the cursor is in "AUTO" position 94 and current operational data, such as sum weight, mean weight, number of combined weighing units, speed of operation and total number of deliveries are displayed, in addition to the present operating parameters. In the pattern of FIG. 7, small circles are displayed under weigh units numbered 3, 7 and 10 and indicate that these units are selected for combination and another small circle display under "A" means that the combined sum weight 100.2 gram is acceptable. If the circle appears under "L" or "H", it means that the current sum weight is unacceptably low or high, respectively.

If the operator pushes RUN key 52 again in this state, the answer in step 82 will be "YES" and a stop command is provided in step 85 to stop operation of the system.

Although the description will not be made further since it is not necessary to understand the present invention, various modes of operation and display can be realized by putting the cursor on the respective menu items, such as STATISTIC, PRINT or the like, and pushing RUN key 52 to display in similar fashion corresponding secondary menus.

What we claim are:

1. In a combination weighing and packing system including a combination weighing device for successively delivering batches of product each having a target weight determined by means of combination weighing operation, and a packing device for sequentially packing said batches of product at a corresponding operating speed, a control device for controlling said combination weighing device and said packing device, said control device comprisimg:

means for storing operating conditions including the target weight for said weighing device and the corresponding operating speed of said packing device, means for reading said operating conditions out of said storing means and for displaying the read out operating conditions, means for selectively specifying said displayed operating conditions, and means for operating said weighing device and said packing device according to said specified operating conditions.

2. A control device, as set forth in claim 1, further including means for replacing said operating condition stored in said storing means with the corresponding revised operating condition.

3. A control device, as set forth in claim 1 wherein said specifying means is operable to selectively specify one of a group of identification codes of operating conditions stored in said storing means and said reading and display means is operable to display a specific group of said identification codes and to read and display operating parameters corresponding to said specified code.

4. A control device, as set forth in claim 1, wherein said display means is arranged to display current operational data of said weighing and/or packing devices.

5. A control device, as set forth in claim 1, wherein said control device includes means for collecting operational data of said weighing and/or packing devices and statistically processing the operational data, said display means being operable to display the results of said processing.

6. A combination weighing and packing method for sequentially packing batches of product successively weighed out from a combination weighing device by a packing device; comprising steps of
   storing operating conditions of said weighing device and said packing device including target weights of said weighing device and operating speeds of the packing device in accordance with a predetermined classification,
   reading and displaying said stored operating conditions according to said classification,
   selectively specifying said displayed operating conditions, and
   operating said weighing device and said packing device under said specified operating conditions.

7. A combination weighing and packing method, as set forth in claim 6, wherein said displaying step includes steps of modifying said stored operating conditions.

8. A common control device for controlling both the operation of a combination weigher adapted to successively deliver batches of product, each having a target weight, and the operation of a packing device adapted to sequentially pack at an operating speed the batches of product delivered from the combination weigher, this common control device comprising:
   means for storing the operating conditions including target weights and the operating speeds;
   means for selecting from said means for storing, operating conditions including one of the target weights for the combination weigher and the corresponding one of the operating speed of the packing device;
   means for supplying the selected operating conditions to the combination weigher and packing device including supplying the selected target weight to the combination weigher and supplying the selected operating speed to the packing device;
   means for initiating the operation of the combination weigher in accordance with the supplied target weight and for initiating operation of the packing device in accordance with the supplied operating speed; and
   means for receiving operating data from the combination weigher and packing devices and for displaying the received data.

9. A common control device as set for in claim 8 further comprising means for revising said operating conditions stored in said storing means.

10. A common control device as set forth in claim 8 wherein said selecting means is adapted for selecting one of a group of identification codes, each code corresponding to a set of operating conditions stored in said storing means, said receiving and display means being adapted to display a set of said operating conditions corresponding to the selected identification code.

11. A common control device as set forth in claim 8 wherein said receiving and display means is adapted for displaying current operational data of said combination weigher and/or packing device.

12. A common control device as set forth in claim 8 further comprising means for collecting operational data of said weigher and/or packing device and statistically processing said operational data, said display means being adapted to display the results of said processing.

13. A common control device for controlling both the operation of a combination weigher adapted to successively deliver batches of product each having a target weight, and the operation of a packing device adapted to sequentially pack at a corresponding operating speed the batches of product delivered from the combination weigher, said common control device comprising:
   means for displaying operating conditions of the combination weigher and the packing device;
   switch means for selecting whether the combination weigher or packing device operating conditions are displayed;
   means for changing one of the displayed operating conditions;
   means for changing one of the displayed operating conditions;
   means for storing said displayed operating conditions;
   means for supplying the stored operating conditions to the combination weigher and packing device including supplying the target weight to the combination weigher and the corresponding operating speed to the packing device; and
   means for initiating the operation of the combination weigher in accordance with the supplied target weight and for initiating operation of the packing device in accordance with the supplied operating speed.

14. A common control device as set forth in claim 13 further comprising means for revising said operating conditions stored in said storing means.

15. A common control device as set forth in claim 13 further comprising selecting means adapted for selecting one of a group of identification codes, each code corresponding to a set of operating conditions stored in said storing means, said receiving and display means being adapted to display a set of said operating conditions corresponding to the selected identification code.

16. A common control device as set forth in claim 15 wherein said display means is adapted for displaying current operational data of said combination weigher and/or packing device.

17. A common control device as set forth in claim 15 further comprising means for collecting operational data of said weigher and/or packing device and statistically processing said operational data, said display means being adapted to display the results of said processing.

18. A method of controlling both the operation of a combination weigher adapted for successively delivering batches of product, each having a target weight, and the operation of a packing device adapted for sequentially packing at a corresponding operating speed the batches of product, said method comprising the steps of:

selecting operating conditions for the combination weigher and packing device;

storing the selected operating conditions;

supplying the stored operating conditions to the combination weigher and packing device including supplying the target weight to the combination weigher and the corresponding operating speed to the packing device;

initiating the operation of the combination weigher and the packing device in accordance with the stored operating conditions; and receiving operating data from the combination weigher and packing device and displaying the received operating data.

19. A common control device as set forth in claim 8, wherein said control means further comprises means for storing numerical data of the operating conditions received from said devices, for statistically processing the received numerical data and for displaying the processed data.

20. A common control device as set forth in claim 8, wherein said means for receiving includes means for displaying a movable cursor, and said control means further comprises means for displaying symbols indicative of modes of operation in which said devices are adapted to operate, and means for selectively operating said device in a mode of operation corresponding to said symbol specified by said cursor.

21. In a combination weighing and packing system including a combination weighing device for successively delivering batches of product each having a target weight by means of combination weighing operation, and a packing device for sequentially packing said batches of product in separate bags at a corresponding operating speed, a control device for controlling operations of said combination weighing and packing devices; said control device comprising:

memory means for storing tables, each table defining a plurality of combinations of predetermined operating conditions of said weighing and packing devices including a target weight and a corresponding operating speed;

means for reading a selected one of said tables out of said memory means for display on a display screen;

means for transferring the operating conditions of the selected table to said weighing and packing devices to enable the respective devices to be operated according to said operating conditions.

22. The control device of claim 21 further including means for selecting at least one of the operating conditions on said display screen by a movable cursor and for modifying the value of the selected condition.

23. The control device of claim 21 further including means for receiving from said devices data representing current operating conditions and for displaying the received data on the display screen.

24. A common control device as set forth in claim 21, wherein said control means further comprises means for storing numerical data of the operating conditions received from said devices, for statistically processing the received numerical data and for displaying the processed data.

25. A common control device as set forth in claim 21, wherein said means for reading includes means for displaying a movable cursor on the display screen, and said control means further comprises means for displaying symbols indicative of modes of operation in which said devices are adapted to operate, and means for selectively operating said devices in a mode of operation corresponding to said symbol specified by said cursor.

26. A common control device for controlling both the operation of a combination weigher adapted to successively deliver batches of product, each having a target weight, and the operation of a packing device adapted to sequentially pack at a corresponding operating speed the batches of product delivered from the combination weigher, said common control device comprising:

means for storing the operating conditions including target weights and corresponding operating speed;

means for selecting, from said means for storing, operating conditions including one of the target weights for the combination weigher and the corresponding one of the operating speeds of the packing device;

means for supplying the selected operating conditions to the combination weigher and packing device including supplying the selected target weight to the combination weigher and supplying the selected operating speed to the packing device;

means for initiating the operation of the combination weigher in accordance with the supplied target weight and for initiating operation of the packing device in accordance with the supplied operating speed;

means for receiving operating data from the combination weigher and packing devices and for displaying the received data; and switching means for selecting whether the combination weigher or packing device operating data are supplied to the means for receiving and displaying.

* * * * *

UNITED STATES PATENT AND TRADEMARK OFFICE
CERTIFICATE OF CORRECTION

PATENT NO. : 4,780,830
DATED : October 25, 1988
INVENTOR(S) : Yuji Omi, Yoshiharu Toyoda, and Masato Inoue It is certified that error appears in the above—identified patent and that said Letters Patent is hereby corrected as shown below:

Column 1, line 6, "system and, particular, to a" should read --system and, in particular, to a--.
Column 1, line 35, "delivery and likes" should read --delivery and the likes--.
Column 1, line 31, "display devices, respectively" should read --display devices--.
Column 2, lines 31-32, "operation condition memory" should read --operating condition memory--.
Column 2, line 40, "Referring to again to" should read --Referring again to--.
Column 2, line 59, "for possible data of operation parameters" should read --of possible data for operation parameters--.
Column 3, lines 39-40, "parameter operation," should read --parameter setting operation,--.
Column 3, line 67, "value desired to be changed on in" should read --value desired to be changed on--.
Column 4, line 39, "on the respective menu" should read --on respective menu--.
Column 4, claim 1, line 52, "comprisimg:" should read --comprising:--.
Column 5, claim 8, lines 41-42, "weigher, this common" should read --weigher, said common--.
Column 5, claim 9, line 63, "as set for in claim" should read --as set forth in claim--.
Column 6, claim 17, line 57, "claim 15" should read --claim 13--.

UNITED STATES PATENT AND TRADEMARK OFFICE
CERTIFICATE OF CORRECTION

PATENT NO.  : 4,780,830

DATED       : October 25, 1988

INVENTOR(S) : Yuki Omi, Yoshiharu Toyoda, and Masato Inoue

It is certified that error appears in the above-identified patent and that said Letters Patent is hereby corrected as shown below:

Column 7, claim 20, line 28, "said device in a mode" should read --said devices in a mode--.

Signed and Sealed this

Twelfth Day of September, 1989

Attest:

DONALD J. QUIGG

*Attesting Officer*　　　　*Commissioner of Patents and Trademarks*